United States Patent
Sobel (10) Patent No.: US 9,059,919 B1
(45) Date of Patent: Jun. 16, 2015

(54) SYSTEMS AND METHODS FOR PRESERVING NETWORK SETTINGS FOR USE IN A PRE-BOOT ENVIRONMENT

(75) Inventor: William E. Sobel, Jamul, CA (US)

(73) Assignee: Symantec Corporation, Mountain View, CA (US)

( * ) Notice: Subject to any disclaimer, the term of this patent is extended or adjusted under 35 U.S.C. 154(b) by 378 days.

(21) Appl. No.: 13/073,702

(22) Filed: Mar. 28, 2011

(51) Int. Cl.
*H04L 12/24* (2006.01)
*G06F 11/20* (2006.01)

(52) U.S. Cl.
CPC ............ *H04L 41/12* (2013.01); *G06F 11/2033* (2013.01)

(58) Field of Classification Search
USPC ......................................................... 709/220
See application file for complete search history.

(56) References Cited

U.S. PATENT DOCUMENTS

| | | | |
|---|---|---|---|
| 6,691,170 B1 * | 2/2004 | Gitlin et al. ................... 709/245 |
| 7,039,688 B2 * | 5/2006 | Matsuda et al. ............. 709/220 |
| 7,398,382 B2 * | 7/2008 | Rothman et al. ................... 713/2 |
| 2003/0208602 A1 * | 11/2003 | Bhalla et al. ................... 709/227 |
| 2004/0128376 A1 * | 7/2004 | Matsune et al. .............. 709/223 |
| 2004/0202466 A1 * | 10/2004 | Koch et al. ......................... 398/1 |
| 2005/0147091 A1 * | 7/2005 | Momozono et al. .......... 370/356 |
| 2005/0210316 A1 * | 9/2005 | Benhase et al. ................... 714/6 |
| 2006/0031921 A1 * | 2/2006 | Danforth et al. ................... 726/1 |
| 2006/0155866 A1 * | 7/2006 | Wei ............................... 709/231 |
| 2007/0074290 A1 * | 3/2007 | Kobayashi et al. ............. 726/24 |
| 2007/0147373 A1 * | 6/2007 | Yu ................................. 370/390 |
| 2007/0168088 A1 * | 7/2007 | Ewing et al. ................... 700/295 |
| 2007/0174659 A1 * | 7/2007 | Takuwa et al. ................... 714/4 |
| 2008/0086586 A1 * | 4/2008 | Ogawa et al. .................. 711/101 |
| 2008/0209260 A1 * | 8/2008 | Vykunta ............................ 714/6 |
| 2010/0280999 A1 * | 11/2010 | Atluri et al. ................... 707/657 |
| 2011/0119358 A1 * | 5/2011 | Woodward .................... 709/220 |
| 2013/0282795 A1 * | 10/2013 | Tsao ............................. 709/203 |

* cited by examiner

*Primary Examiner* — Brian P Whipple
*Assistant Examiner* — James Edwards
(74) *Attorney, Agent, or Firm* — Holland & Hart, LLP (57) ABSTRACT

A computer-implemented method to preserve network settings for a computing device in a pre-boot environment is described. Initiation of a shut down process for the computing device is detected. Network configuration information is identified. A timestamp to associate with the identified network configuration information is generated. The identified network configuration information and the associated timestamp are stored in a storage medium.

20 Claims, 8 Drawing Sheets

SYSTEMS AND METHODS FOR PRESERVING NETWORK SETTINGS FOR USE IN A PRE-BOOT ENVIRONMENT

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often requires human and computer interaction. Users of computer technologies continue to demand an increase in the efficiency of these technologies. Improving the efficiency of computer technologies is always desirable to anyone who uses and relies on computers.

While a computer is operating, it may be referred to as being in a booted up state. When a computer is powered on, before it is in the booted up state, the computer may be referred to as being in a pre-boot state. In addition, an administrator or other user of the computer may desire to reboot or restart the computer. In other words, the administrator may desire to switch the computer from a booted up state to a pre-boot state.

When a computer switches from a booted up state to a pre-boot state (either by powering down and then powering back up the computer or by rebooting the computer), certain information may be discarded. As a result, the computer may be required to reacquire or request that information while it is in the pre-boot state. The need to request or reacquire this information may hinder the efficiency of the computer. As a result, benefits may be realized by providing systems and methods for preserving information that may be used by the computer in the pre-boot state. In particular, benefits may be realized by providing systems and methods for preserving network settings to be used by the computer in the pre-boot state.

SUMMARY

According to at least one embodiment, a computer-implemented method to preserve network settings for a computing device in a pre-boot environment is described. Initiation of a shut down process for the computing device is detected. Network configuration information is identified. A timestamp to associate with the identified network configuration information is generated. The identified network configuration information and the associated timestamp are stored in a storage medium.

In one embodiment, the shut down process may include a process to reboot the computing device. The shut down process may also include a process to power down the computing device. In one configuration, the storage medium may be accessible by a primary operating system of the computing device.

In one example, the shut down process may include placing the computing device in a pre-boot environment. A determination may be made as to whether network access is required while in the pre-boot environment. Upon determining that network access is required, the network configuration information and associated timestamp may be retrieved from the storage medium. In one configuration, the timestamp may be analyzed to determine whether the retrieved network configuration information is valid. Upon determining that the retrieved network configuration information is valid, the network configuration information may be applied to gain access to a network.

A computing device configured to preserve network settings for use in a pre-boot environment is also described. The computing device may include a processor and memory in electronic communication with the processor. The device may also include a shut down module configured to detect initiation of a shut down process for the computing device, and identify network configuration information. The shut down module may also be configured to generate a timestamp to associate with the identified network configuration information, and store the identified network configuration information and the associated timestamp in a storage medium.

A computer-program product for preserving network settings for a computing device in a pre-boot environment is also described. The computer-program product may include a non-transitory computer-readable medium having instructions thereon. The instructions may include code programmed to detect initiation of a shut down process for the computing device, and code programmed to identify network configuration information. The instructions may also include code programmed to generate a timestamp to associate with the identified network configuration information, and code programmed to store the identified network configuration information and the associated timestamp in a storage medium.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

When a computer boots up, an operating system for the computer may be loaded into the computer's main memory or random access memory (RAM). Once the operating system is loaded, the operating system may be ready for users to execute applications. The state of the computer before the operating system is loaded into memory may be referred to as a pre-boot state or a pre-boot environment.

In one example, when the operating system is loaded into memory, the computer may acquire network settings that may allow the computer to communicate with other devices across a network connection. The network settings may be saved in memory of the computer. Often times, when the computer executes a shut down process or sequence, it may be either be immediately rebooted or powered down for an extended period of time. When a shut down sequence is initiated the current network settings used by the computer in the booted up state may be discarded from the memory. In some instances, a computer in the pre-boot environment may require the network settings to carry out certain functions before the operating system is loaded into memory. For example, an administrator of the computer may desire to perform various recovery functions on the computer while the computer is in the pre-boot environment. Network access may be required to perform these recovery functions. As another example, the computer in the pre-boot environment may be required to communicate with an encryption provider across a network connection before the operating system is loaded into memory. For example, security credentials or other information may need to be transmitted to the encryption provider across the network connection before the computer boots up. As a result, the network settings may be required when the computer is in the pre-boot environment. Because the network settings, however, are no longer stored in memory, a delay may occur as the computer attempts to acquire (or reacquire) the network settings while in the pre-boot environment.

In some cases, a user may reboot a computer into the pre-boot environment to perform maintenance or a restoration task on the computer. If network access is required while the computer is in the pre-boot environment, a delay may be present before the computer enters the pre-boot environment. In one configuration, the delay may be caused by the computer attempting to configure the network access. This delay may exist even if the user has a valid static or dynamic host configuration protocol (DHCP) Internet protocol (IP) address assigned to the operating system of the computer. Currently, when a computer is rebooted, the networking configuration information is discarded. As a result, when the computer attempts to enter the pre-boot environment, it may be required to maintain the static network configuration or discover and request a new IP address from a DHCP server. In many cases, this may be the same IP address because many DHCP servers may match on the media access control (MAC) address of the requestor.

In one embodiment, the present systems and methods may replicate network settings into pre-boot environments to minimize or eliminate the delay that arises in current systems when a computer is rebooted or powered up to the pre-boot environment. As explained above, the need to obtain a network address may add boot delay when entering into the pre-boot environment. The present systems and methods may minimize or eliminate this delay.

Figure 1:
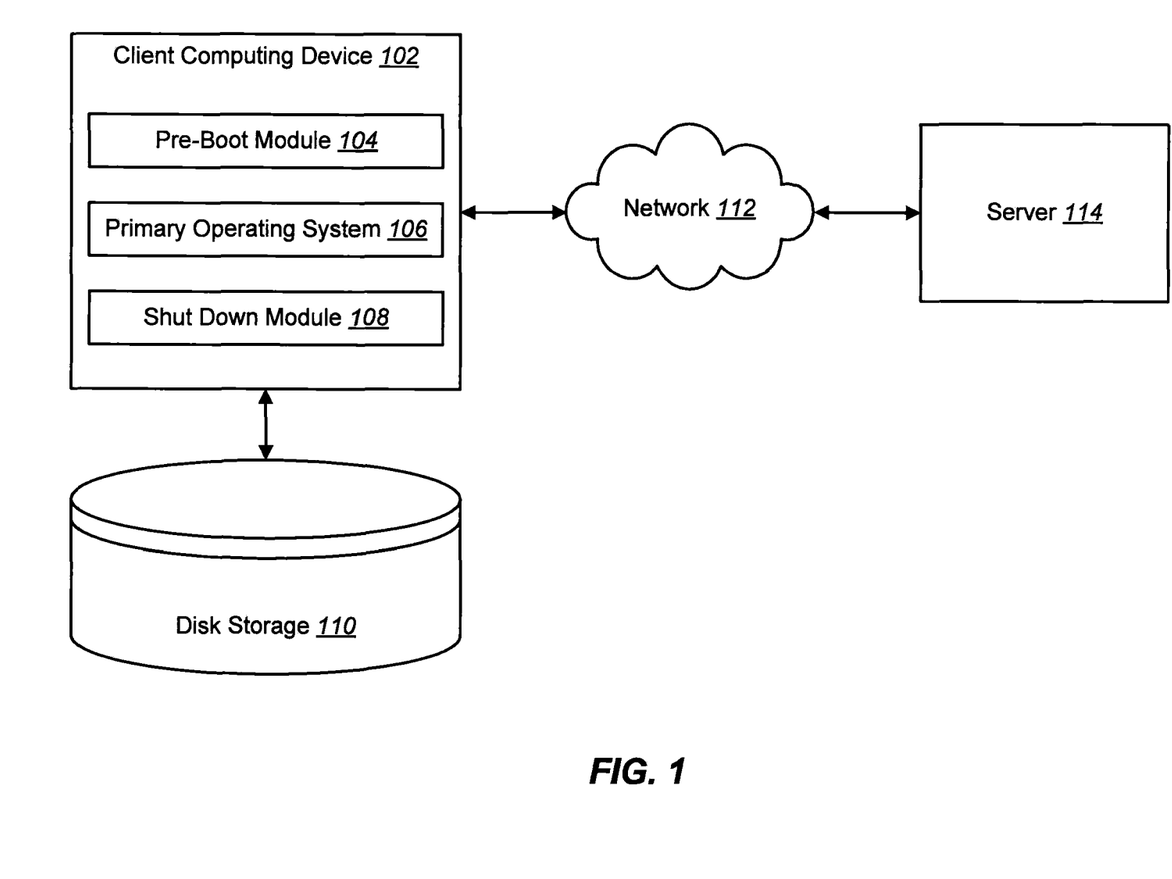
FIG. 1 is a block diagram illustrating one embodiment of an environment in which the present systems and methods may be implemented.

FIG. 1 is a block diagram illustrating one embodiment of an environment in which the present systems and methods may be implemented. In one embodiment, a client computing device 102 may communicate with a server 114 across a network 112 connection. The client computing device 102 may be, but is not limited to, a personal computer (PC), a laptop, a personal digital assistant (PDA), a smartphone, or any other type of computing device.

The client computing device 102 may include a pre-boot module 104, a primary operating system 106, and a shut down module 108. In one configuration, the pre-boot module 104 may execute various sequences while the client computing device 102 is in a pre-boot environment. To boot up the client computing device 102, the primary operating system 106 may be stored in memory of the device 102. The operating system 106 may include programs and data that execute on the device 102. The primary operating system 106 may also manage hardware resources of the device 102. The shut down module 108 may execute various sequences during a shut down procedure of the device 102. A shut down procedure may include immediately restarting (i.e., rebooting) the computing device 102, powering down the device 102 for an extended period of time, etc. In one embodiment, disk storage 110 may store various information and data of the client computing device 102.

Figure 2:
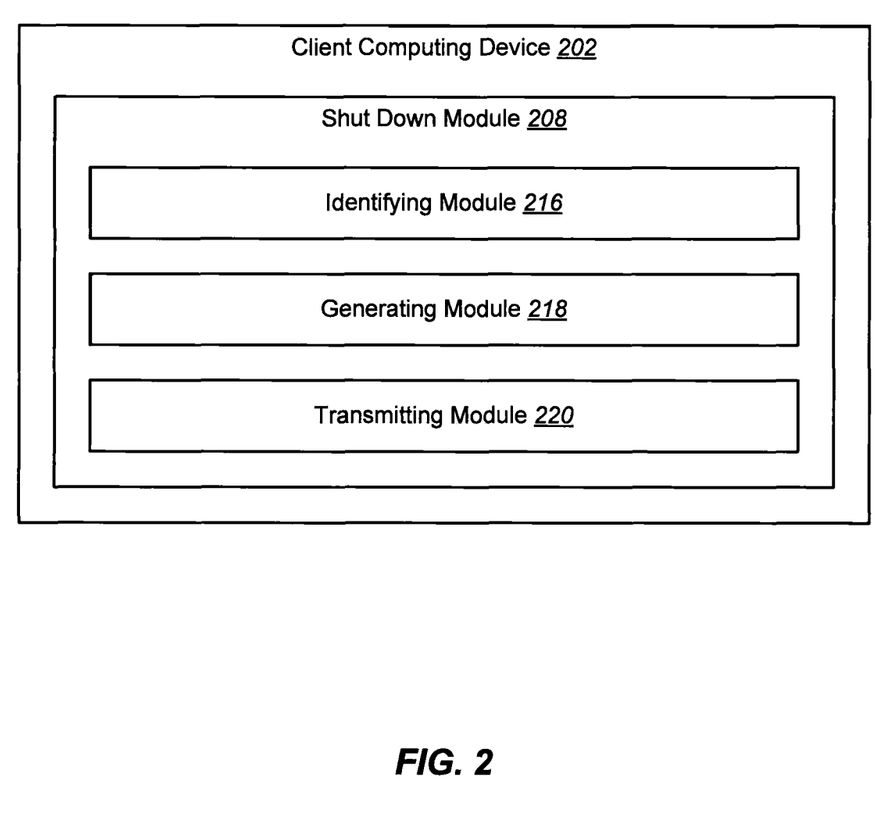
FIG. 2 is a block diagram illustrating one embodiment of a client computing device that may implement the present systems and methods.

FIG. 2 is a block diagram illustrating one embodiment of a client computing device 202 that may implement the present systems and methods. In one configuration, the device 202 may include a shut down module 208. As mentioned above, the shut down module 208 may implement various sequences to restart (or reboot) the device 202 or power down the device 202 for an extended period of time. The shut down module 208 may include an identifying module 216, a generating module 218, and a transmitting module 220. In one configuration, the identifying module 216 may identify certain information or data on the client computing device 202. In one embodiment, the identifying module 216 may identify network configuration information. The identified network configuration information may include the network configuration for the primary operating system 106. This configuration information may include static addresses and dynamic addresses. If dynamic, the address of a DHCP server and the MAC address of a network interface card (NIC) if multiple NICs are present.

In one example, the generating module 218 may generate a timestamp to associate with the identified network configuration information. In one configuration, the timestamp may be based on a shared time source such as, but not limited to, an onboard bios clock. The transmitting module 220 may transmit the identified network configuration information and the associated timestamp to disk storage 110. As a result, the network configuration information may be identified, stored, and associated with a timestamp before the client computing device 202 completes the shut down sequence (e.g., rebooting, powering down, etc.).

Figure 3:
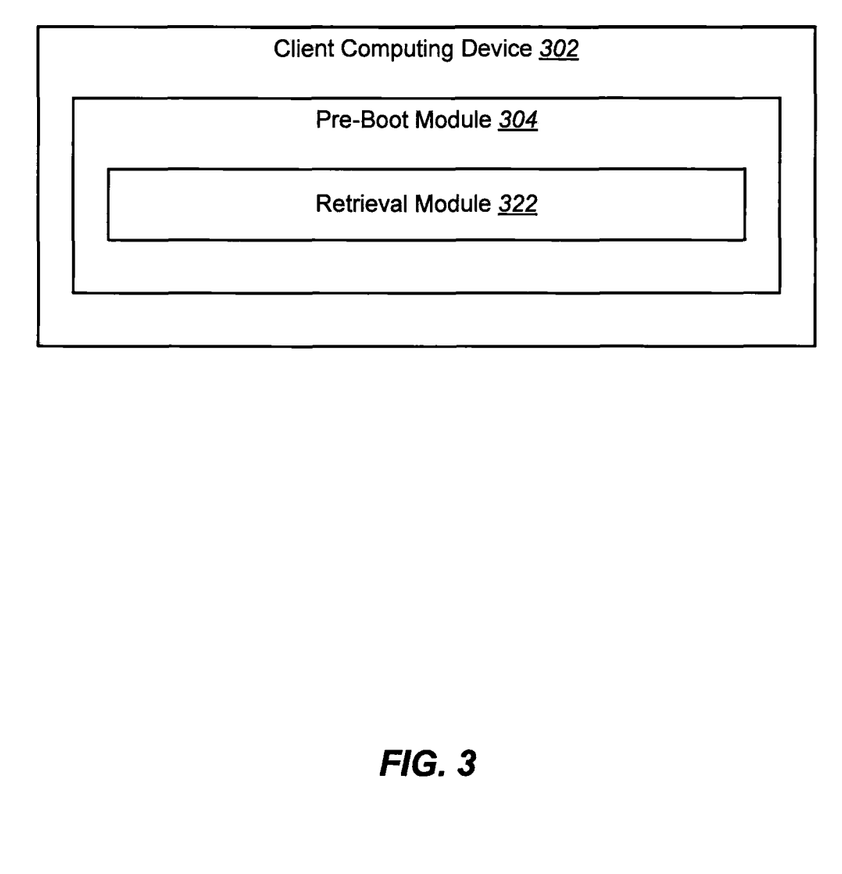
FIG. 3 is a block diagram illustrating another embodiment of a client computing device that may implement the present systems and methods.

FIG. 3 is a block diagram illustrating one embodiment of a client computing device 302 that may implement the present systems and methods. In one configuration, the device 302 may include a pre-boot module 304. The pre-boot module 304 may execute various sequences while the device 302 is in a pre-boot environment. In one example, the pre-boot module 304 may include a retrieval module 322. The retrieval module 322 may retrieve network configuration information previously stored in disk storage 110. The retrieval module 322 may analyze a timestamp associated with the network configuration information to determine whether the retrieved information is valid. If valid, the retrieved network configuration information may be used to configure an Internet Protocol (IP) address of an NIC. For static connections, this may be the network address the device 302 may use to boot up. If the retrieve network configuration information includes a dynamic address, the retrieval module 322 may determine whether a DHCP lease has expired. If the lease has not expired, the dynamic network configuration information may be considered to be safe and the device 302 may continue to use the assigned address.

Figure 4:
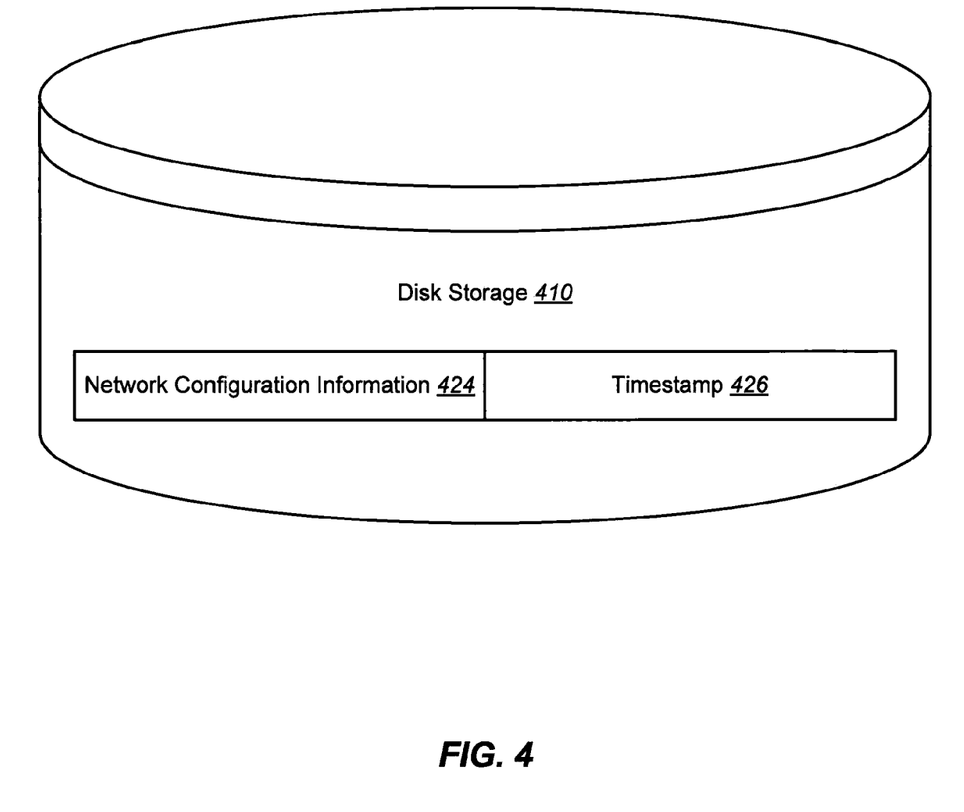
FIG. 4 is a block diagram illustrating one embodiment of disk storage that may be implemented in the present systems and methods.

FIG. 4 is a block diagram illustrating one embodiment of disk storage 410 that may be implemented by the present systems and methods. In one example, the disk storage 410 may store network configuration information 424 and a timestamp 426 associated with the information 424. The network configuration information 424 may be stored in the disk storage 410 during a shut down process of a client computing device 102. The shut down process may be initialized to reboot the device 102 or power down the device 102 for an extended period of time. When the client computing device 102 enters the pre-boot environment, if network access is required, the device 102 may retrieve the network configuration information 424 from the disk storage 410. The timestamp 426 may be analyzed to determine whether the retrieved network configuration information 424 is valid.

Figure 5:
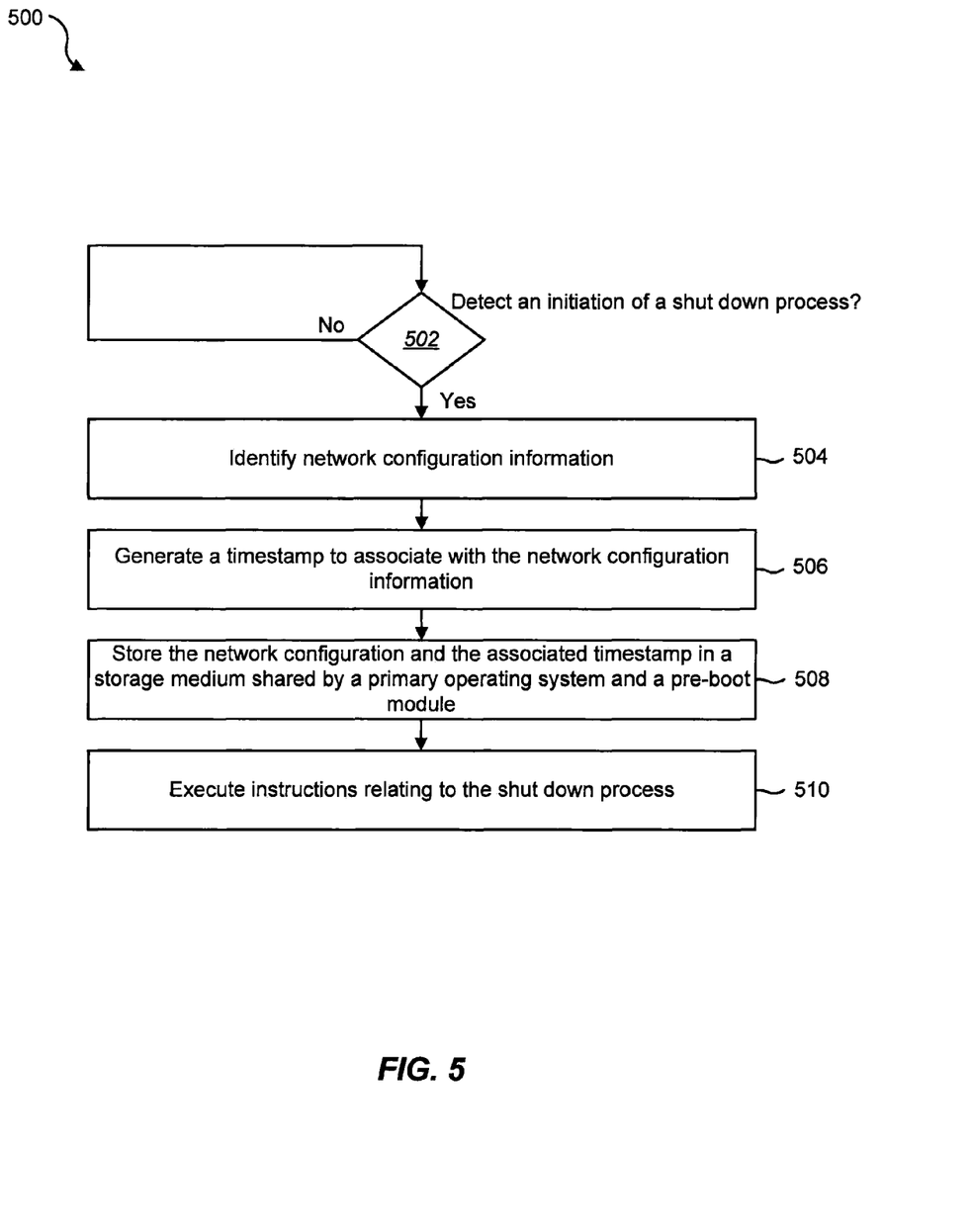
FIG. 5 is a flow diagram illustrating one embodiment of a method to preserve network settings for a device in a pre-boot environment.

FIG. 5 is a flow diagram illustrating one embodiment of a method 500 to preserve network settings for a device in a pre-boot environment. In one example, the method 500 may be implemented by the shut down module 108.

In one embodiment, a determination 502 may be made as to whether an initiation of a shut down process has been detected. The shut down process may include a process to restart or reboot the client computing device 102. The shut down process may also include a process to power down the client computing device 102 for an extended period of time.

If it is determined 502 that a shut down process initiation has not been detected, the method 500 may return to continue to determine 502 whether an initiation of a shut down process has been detected. If, however, it is determined 502 that an initiation of a shut down process has been detected, network configuration information may be identified 504. In other words, current network settings of the client computing device 102 may be identified. A timestamp may be generated 506 to be associated with the identified network configuration information. In one embodiment, the identified network configuration information and the associated timestamp may be stored 508 in a storage medium shared by a primary operating system 106 and a pre-boot module 104. The storage medium may be disk storage for the client computing device 102. In one embodiment, the pre-boot module 104 may execute various sequences while the client computing device 102 is in a pre-boot environment. In one configuration, instructions relating to the initiated shut down process may be executed 510 and the device 102 may restart (reboot) or power down.

Figure 6:
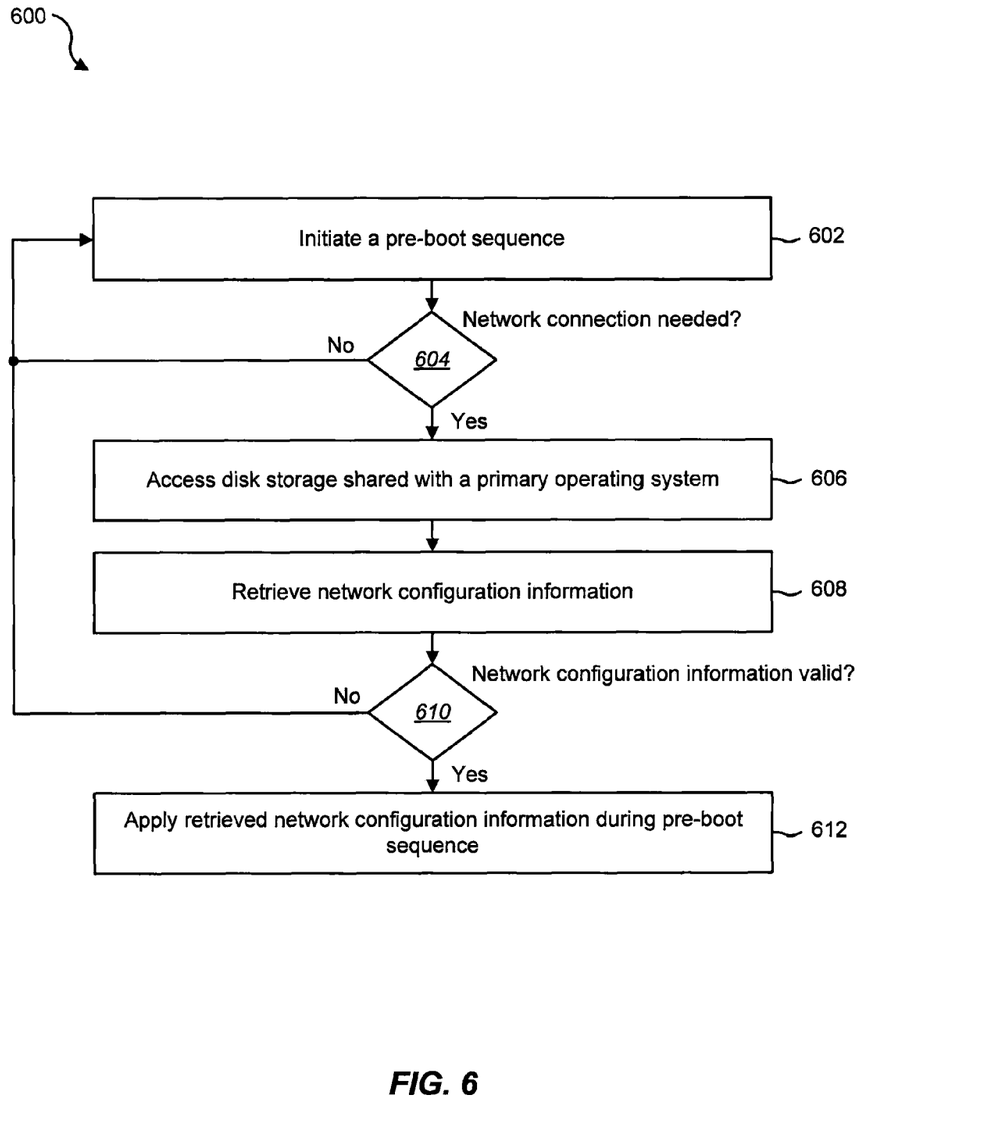
FIG. 6 is a flow diagram illustrating one embodiment of a method to retrieve network settings in a pre-boot environment.

FIG. 6 is a flow diagram illustrating one embodiment of a method 600 to retrieve network settings in a pre-boot environment. In one configuration, the method 600 may be implemented by the pre-boot module 104.

In one example, a pre-boot sequence may be initiated 602. For example, the computing device 102 may be rebooted (restarted) without powering down. In other words, the computing device 102 may switch from a booted up state to a pre-boot state. The pre-boot sequence may also be initiated 602 when the computing device 102 is powered up after being in a powered down state. A determination 604 may be made as to whether a network connection is needed while in the pre-boot environment. If it is determined 604 that a network connection is not needed, the method 600 may return to initiate 602 a pre-boot sequence. If, however, it is determined 604 that a network connection is desired while in the pre-boot environment, disk storage 110 shared with a primary operating system 106 may be accessed 606. Network configuration information previously stored in the disk storage 110 may be retrieved 608. The network configuration information may be a static address or a dynamic address. In one embodiment, a determination 610 may be made as to whether the retrieved network configuration information is valid. In one embodiment, a timestamp associated with the network configuration information may be analyzed to determine 610 whether the information is valid. If it is determined 610 that the information is not valid, the method 600 may return to initiate 602 a pre-boot sequence. If, however, it is determined 610 that the network configuration information is valid, the retrieved network configuration information may be applied 612 during the pre-boot sequence. As a result, the client computing device 102 may gain access to a particular network using the network configuration information retrieved while the device 102 was in a pre-boot environment.

Figure 7:
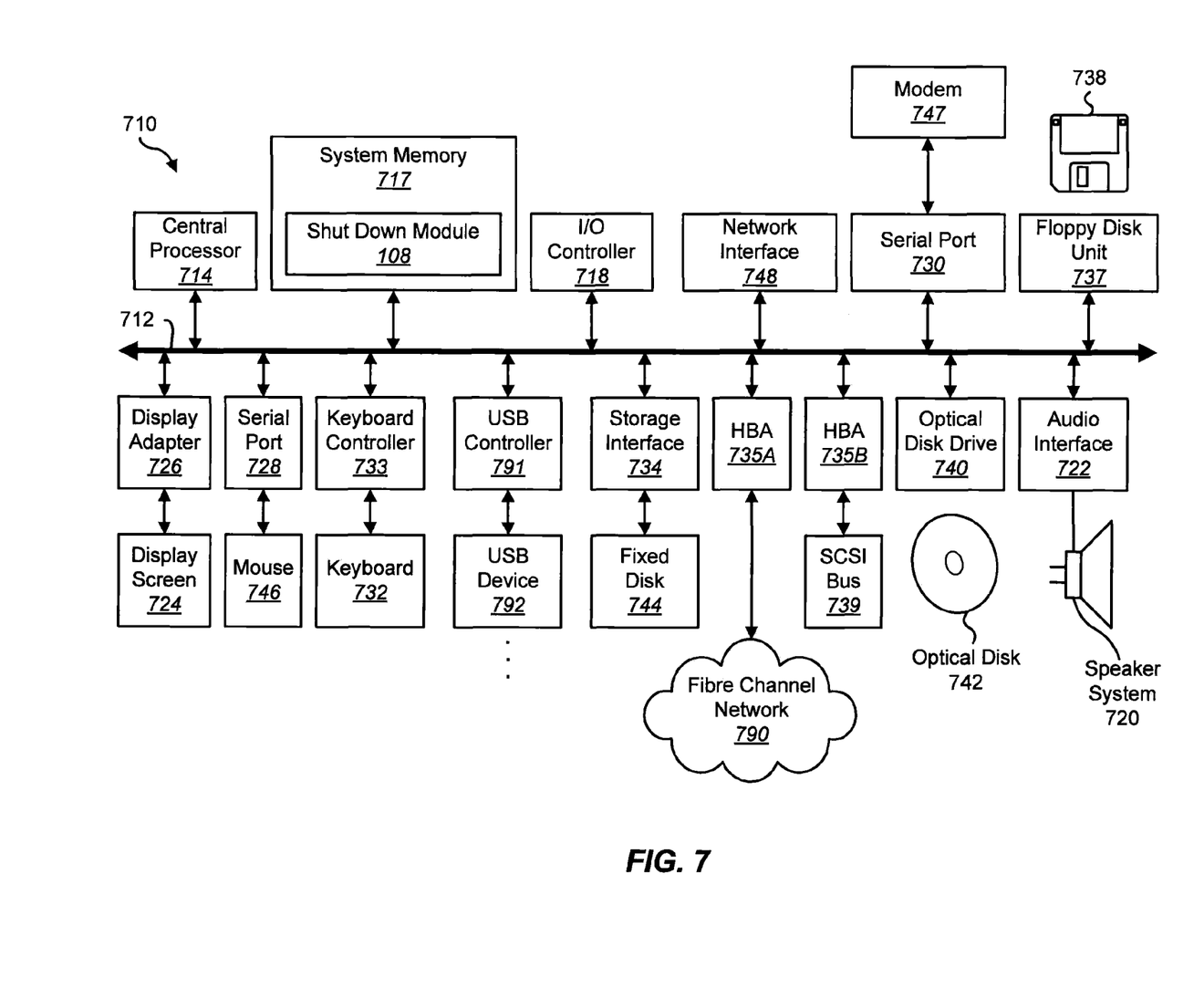
FIG. 7 depicts a block diagram of a computer system suitable for implementing the present systems and methods.

FIG. 7 depicts a block diagram of a computer system 710 suitable for implementing the present systems and methods. Computer system 710 includes a bus 712 which interconnects major subsystems of computer system 710, such as a central processor 714, a system memory 717 (typically RAM, but which may also include ROM, flash RAM, or the like), an input/output controller 718, an external audio device, such as a speaker system 720 via an audio output interface 722, an external device, such as a display screen 724 via display adapter 726, serial ports 728 and 730, a keyboard 732 (interfaced with a keyboard controller 733), multiple USB devices 792 (interfaced with a USB controller 791), a storage interface 734, a floppy disk unit 737 operative to receive a floppy disk 738, a host bus adapter (HBA) interface card 735A operative to connect with a Fibre Channel network 790, a host bus adapter (HBA) interface card 735B operative to connect to a SCSI bus 739, and an optical disk drive 740 operative to receive an optical disk 742. Also included are a mouse 746 (or other point-and-click device, coupled to bus 712 via serial port 728), a modem 747 (coupled to bus 712 via serial port 730), and a network interface 748 (coupled directly to bus 712).

Bus 712 allows data communication between central processor 714 and system memory 717, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the shut down module 108 to implement the present systems and methods may be stored within the system memory 717. Applications resident with computer system 710 are generally stored on and accessed via a computer readable medium, such as a hard disk drive (e.g., fixed disk 744), an optical drive (e.g., optical drive 740), a floppy disk unit 737, or other storage medium. Additionally, applications can be in the form of electronic signals modulated in accordance with the application and data communication technology when accessed via network modem 747 or interface 748.

Storage interface 734, as with the other storage interfaces of computer system 710, can connect to a standard computer readable medium for storage and/or retrieval of information, such as a fixed disk drive 744. Fixed disk drive 744 may be a part of computer system 710 or may be separate and accessed through other interface systems. Modem 747 may provide a direct connection to a remote server via a telephone link or to the Internet via an internet service provider (ISP). Network interface 748 may provide a direct connection to a remote server via a direct network link to the Internet via a POP (point of presence). Network interface 748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 7 need not be present to practice the present systems and methods. The devices and subsystems can be interconnected in different ways from that shown in FIG. 7. The operation of a computer system such as that shown in FIG. 7 is readily known in the art and is not discussed in detail in this application. Code to implement the present disclosure can be stored in computer-readable medium such as one or more of system memory 717, fixed disk 744, optical disk 742, or floppy disk 738. The operating system provided on computer system 710 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 8:
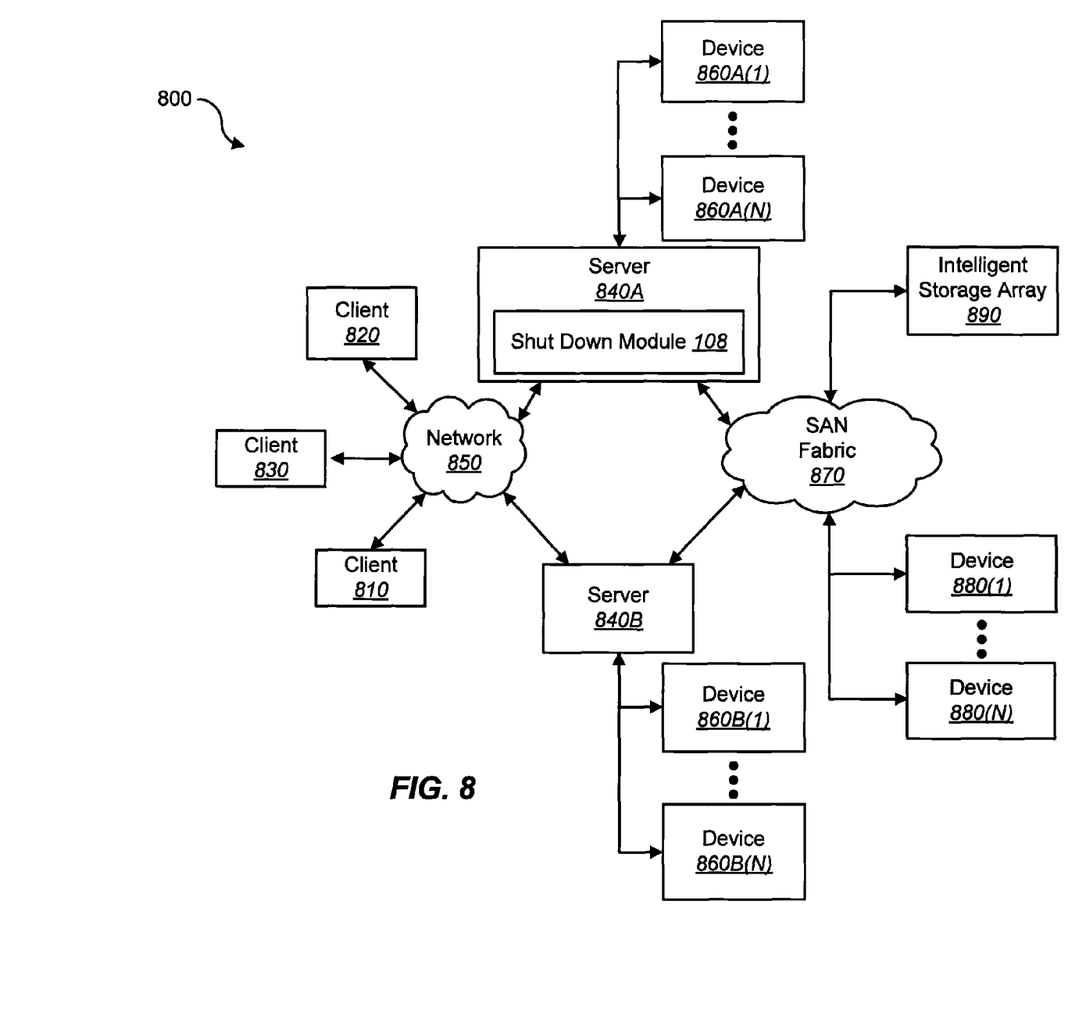
FIG. 8 is a block diagram depicting a network architecture in which client systems, as well as storage servers (any of which can be implemented using computer system), are coupled to a network.

FIG. 8 is a block diagram depicting a network architecture 800 in which client systems 810, 820 and 830, as well as storage servers 840A, 840B (any of which can be implemented using computer system 810), are coupled to a network 850. In one embodiment, the shut down module 108 may be located within the storage servers 840A, 840B to implement the present systems and methods. The storage server 840A is further depicted as having storage devices 860A(1)-(N) directly attached, and storage server 840B is depicted with storage devices 860B(1)-(N) directly attached. SAN fabric 870 supports access to storage devices 880(1)-(N) by storage servers 840A, 840B, and so by client systems 810, 820 and 830 via network 850. Intelligent storage array 890 is also shown as an example of a specific storage device accessible via SAN fabric 870.

With reference to computer system 710, modem 747, network interface 748 or some other method can be used to provide connectivity from each of client computer systems 810, 820, and 830 to network 850. Client systems 810, 820, and 830 are able to access information on storage server 840A or 840B using, for example, a web browser or other client software (not shown). Such a client allows client systems 810, 820, and 830 to access data hosted by storage server 840A or 840B or one of storage devices 860A(1)-(N), 860B(1)-(N), 880(1)-(N) or intelligent storage array 890. FIG. 8 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method to preserve network settings for a computing device in a pre-boot environment, comprising:
    detecting, by a processor, initiation of a shut down process for the computing device, the shut down process comprising shutting down an operating system of the computing device;
    upon detecting the initiation of the shut down process, identifying, by the processor, an internet protocol (IP) address assigned to the computing device;
    determining whether the IP address assigned to the computing device is allocated by a dynamic host configuration protocol (DHCP) server;
    generating, by the processor, a timestamp for the identified IP address assigned to the computing device;
    storing the identified IP address assigned to the computing device and the associated timestamp in a storage medium on the computing device;
    upon determining the IP address assigned to the computing device is allocated by a DHCP server, identifying an IP address of the DHCP server and storing the IP address of the DHCP server in the storage medium;
    detecting a startup process of the computing device after detecting initiation of the shut down process; and
    retrieving the IP address assigned to the computing device from the storage medium after detecting the startup process and before the operating system of the computing device is booted.

2. The method of claim 1, wherein the shut down process comprises a process to reboot the computing device.

3. The method of claim 1, wherein the shut down process comprises a process to power down the computing device.

4. The method of claim 1, wherein the storage medium is accessible by a primary operating system of the computing device.

5. The method of claim 1, wherein the shut down process comprises placing the computing device in a pre-boot environment.

6. The method of claim 5, further comprising determining whether network access is required while in the pre-boot environment.

7. The method of claim 6, wherein upon determining that network access is required, the method further comprising retrieving the associated timestamp from the storage medium.

8. The method of claim 7, further comprising analyzing the timestamp to determine whether the retrieved IP address is valid.

9. The method of claim 8, wherein upon determining that the retrieved IP address is valid, the method further comprising applying the IP address to gain access to a network.

10. A computing device configured to preserve network settings for use in a pre-boot environment, comprising:
    a processor;
    memory in electronic communication with the processor; and
    instructions stored in the memory, the instructions being executable by the processor to:
        detect initiation of a shut down process for the computing device, the shut down process comprising shutting down an operating system of the computing device;
        upon detecting the initiation of the shut down process, identify an internet protocol (IP) address assigned to the computing device;
        determine whether the IP address assigned to the computing device is allocated by a dynamic host configuration protocol (DHCP) server;
        generate a timestamp for the identified IP address assigned to the computing device;
        store the identified IP address assigned to the computing device and the associated timestamp in a storage medium on the computing device;
        upon determining the IP address assigned to the computing device is allocated by a DHCP server, identify an IP address of the DHCP server and store the IP address of the DHCP server in the storage medium;
        detecting a startup process of the computing device after detecting initiation of the shut down process; and
        retrieving the IP address assigned to the computing device from the storage medium after detecting the startup process and before the operating system of the computing device is booted.

11. The computing device of claim 10, wherein the shut down process comprises a process to reboot the computing device.

12. The computing device of claim 10, wherein the shut down process comprises a process to power down the computing device.

13. The computing device of claim 10, wherein the storage medium is accessible by a primary operating system of the computing device.

14. The computing device of claim 10, wherein the shut down process comprises placing the computing device in a pre-boot environment.

15. The computing device of claim 14, wherein the instructions are executable by the processor to determine whether network access is required while in the pre-boot environment.

16. The computing device of claim 15, wherein upon determining that network access is required, the instructions are executable by the processor to retrieve associated timestamp from the storage medium.

17. The computing device of claim 16, wherein the instructions are executable by the processor to analyze the timestamp to determine whether the retrieved IP address is valid.

18. The computing device of claim 17, wherein upon determining that the retrieved IP address is valid, the instructions are executable by the processor to apply the IP address to gain access to a network.

19. A computer-program product for preserving network settings for a computing device in a pre-boot environment, the computer-program product comprising a non-transitory computer-readable medium storing instructions thereon, the instructions being executable by the processor to:
    detect initiation of a shut down process for the computing device, the shut down process comprising shutting down an operating system of the computing device;
    upon detecting the initiation of the shut down process, identify an internet protocol (IP) address assigned to the computing device;
    determine whether the IP address assigned to the computing device is allocated by a dynamic host configuration protocol (DHCP) server;
    generate a timestamp for the identified IP address assigned to the computing device;
    store the identified IP address assigned to the computing device and the associated timestamp in a storage medium on the computing device;
    upon determining the IP address assigned to the computing device is allocated by a DHCP server, identify an IP address of the DHCP server and store the IP address of the DHCP server in the storage medium;

detecting a startup process of the computing device after detecting initiation of the shut down process; and retrieving the IP address assigned to the computing device from the storage medium after detecting the startup process and before the operating system of the computing device is booted.

20. The computer-program product of claim 19, wherein the shut down process comprises a process to reboot the computing device.

* * * * *